US012783770B2

(12) United States Patent
Gupta et al.

(10) Patent No.: US 12,783,770 B2
(45) Date of Patent: Nov. 3, 2026

(54) TIMING ANALYSIS OF A DIGITAL INTEGRATED CIRCUIT USING INTENT BASED TIMING CONSTRAINTS

(71) Applicant: INTERNATIONAL BUSINESS MACHINES CORPORATION, Armonk, NY (US)

(72) Inventors: Hemlata Gupta, Hopewell Jct, NY (US); Kerim Kalafala, Rhinebeck, NY (US); Manish Verma, Bangalore (IN); Jennifer Elizabeth Basile, Poughkeepsie, NY (US); Adil Bhanji, Wappingers Falls, NY (US); Eric Foreman, Fairfax, VT (US); Jack Dilullo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 18/192,893

(22) Filed: Mar. 30, 2023

(65) Prior Publication Data

US 2024/0330551 A1 Oct. 3, 2024

(51) Int. Cl.
*G06F 30/3312* (2020.01)
*G06F 119/12* (2020.01)

(52) U.S. Cl.
CPC ...... *G06F 30/3312* (2020.01); *G06F 2119/12* (2020.01)

(58) Field of Classification Search
USPC .......................................................... 716/108
See application file for complete search history.

(56) References Cited

U.S. PATENT DOCUMENTS

| | | | |
|---|---|---|---|
| 8,122,404 B2 | 2/2012 | Sinha et al. | |
| 8,468,483 B2 | 6/2013 | Buck et al. | |
| 9,165,105 B2 | 10/2015 | Hsu et al. | |
| 9,542,524 B2 * | 1/2017 | Gregerson | G06F 30/3312 |
| 9,607,124 B2 | 3/2017 | Bhanji et al. | |
| 10,169,503 B2 * | 1/2019 | Abdul | G06F 30/398 |
| 10,394,983 B2 | 8/2019 | Bhatnagar et al. | |
| 10,831,958 B2 | 11/2020 | Geva et al. | |
| 10,839,126 B1 | 11/2020 | Khomenko et al. | |

(Continued)

OTHER PUBLICATIONS

Huang et al., OpenTimer v2: A New Parallel Incremental Timing Analysis Engine, IEEE Design & Test, vol. 38, Issue 2, dated Apr. 2021, DOI: 10.1109/MDAT.2021.3049177, Date of Publication: Jan. 5, 2021, 14 pages.

(Continued)

*Primary Examiner* — Mohammed Alam
(74) *Attorney, Agent, or Firm* — Onyx IP Group

(57) ABSTRACT

Timing analysis of a digital integrated circuit using intent based timing constraints includes defining a plurality of intent groups for an integrated circuit design. Each intent group is associated with a different clock type of the integrated circuit design. A different timing phase of a plurality of timing phases of one or more clock signals of the integrated circuit design is associated with each intent group. One or more timing constraints is associated with each of the intent groups. A timing result is computed based on propagating the timing phases of each of the intent groups and applying the associated timing constraints from an input to a timing point of the integrated circuit design.

20 Claims, 6 Drawing Sheets

(56) References Cited

U.S. PATENT DOCUMENTS

| | | | | |
|---|---|---|---|---|
| 11,144,694 | B2 * | 10/2021 | Srimal | G06F 30/3323 |
| 11,347,915 | B1 | 5/2022 | Singh et al. | |
| 2017/0337313 | A1 * | 11/2017 | Abdul | G06F 30/30 |
| 2018/0018421 | A1 * | 1/2018 | Abdul | G06F 30/3315 |
| 2021/0216692 | A1 | 7/2021 | Whitty et al. | |
| 2022/0083717 | A1 | 3/2022 | Lo et al. | |

OTHER PUBLICATIONS

Li et al., On Timing Model Extraction and Hierarchical Statistical Timing Analysis, IEEE Transactions on Computer-Aided Design of Integrated Circuits and Systems, vol. 32, Issue 3, dated Mar. 2013, IEEE, DOI: 10.1109/TCAD.2012.2228305, Date of Publication: Feb. 14, 2013, 14 pages.

Salman et al., Utilizing interdependent timing constraints to enhance robustness in synchronous circuits, ELSEVIER, Microelectronics Journal, 43(2):119-127, DOI: 10.1016/j.mejo.2011.11.005, dated Feb. 2012, 9 pages.

Steven Hoover, Timing-Abstract Circuit Design in Transaction-Level Verilog, 2017 IEEE International Conference on Computer Design (ICCD), DOI: 10.1109/ICCD.2017.91, IEEE, Date of Conference: Nov. 5-8, 2017, Date Added to IEEE Xplore: Nov. 23, 2017, 8 pages.

Zhang et al., PieceTimer: A Holistic Timing Analysis Framework Considering Setup/Hold Time Interdependency Using a Piecewise Model, 2016 IEEE/ACM International Conference on Computer-Aided Design (ICCAD), URL: https://doi.org/10.1145/2966986.2967064, Published: Nov. 7, 2016, 8 pages.

* cited by examiner

300

TIMING ANALYSIS OF A DIGITAL INTEGRATED CIRCUIT USING INTENT BASED TIMING CONSTRAINTS

BACKGROUND

Field of the Disclosure

The field of the disclosure is data processing, or, more specifically, methods, apparatus, and products for performing timing analysis of a digital integrated circuit using intent based timing constraints.

Description of Related Art

Fabrication of an integrated circuit or chip includes several steps to finalize such as logic design, analysis, and physical implementation. The chip may be designed according to a hierarchical design methodology such that the chip is divided into functional circuit components or elements. The logic design and component placement must result in a physical implementation that meets the design and performance requirements of the chip. To ensure that the design requirements are met, design analysis such as timing analysis of the chip is performed at different stages and levels of design.

SUMMARY

Exemplary embodiments include a method, apparatus, and computer program product to perform timing analysis of a digital integrated circuit using intent based timing constraints. A method according to an embodiment includes defining a plurality of intent groups for an integrated circuit design. Each intent group is associated with a different clock type of the integrated circuit design. A different timing phase of a plurality of timing phases of one or more clock signals of the integrated circuit design is associated with each intent group. One or more timing constraints is associated with each of the intent groups. A timing result is computed based on propagating the timing phases of each of the intent groups and applying the associated timing constraints from an input to a timing point of the integrated circuit design.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
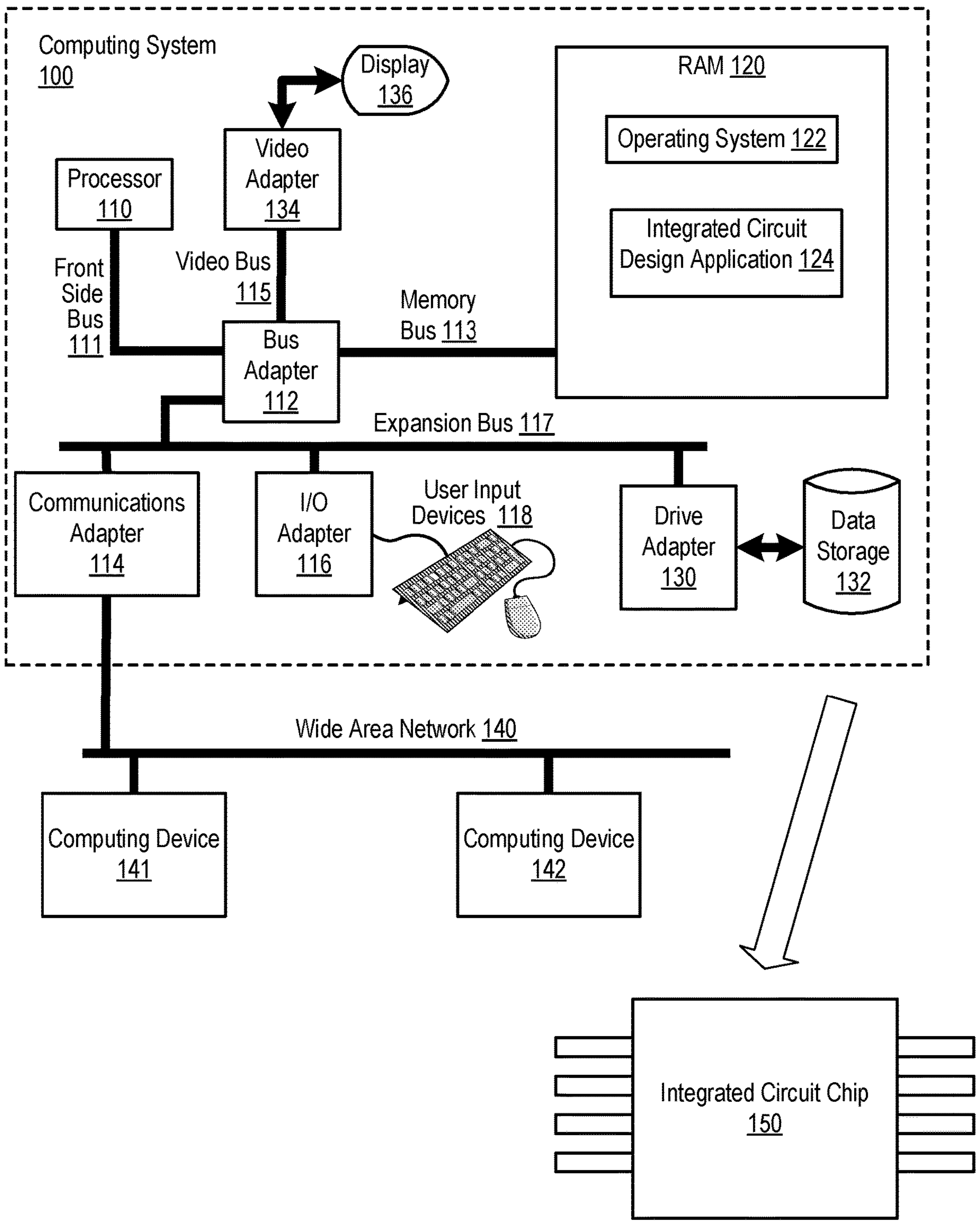
FIG. 1 shows a block diagram of an example computing system configured for performing timing analysis of a digital integrated circuit using intent based timing constraints in accordance with embodiments of the present disclosure.

Exemplary apparatus and systems for performing timing analysis of a digital integrated circuit using intent based timing constraints in accordance with the present disclosure are described with reference to the accompanying drawings, beginning with FIG. 1. FIG. 1 sets forth a block diagram of automated computing machinery comprising an exemplary computing system 100 configured for performing timing analysis of a digital integrated circuit using intent based timing constraints according to embodiments of the present disclosure. The computing system 100 of FIG. 1 includes at least one computer processor 110 or 'CPU' as well as random access memory ('RAM') 120 which is connected through a high speed memory bus 113 and bus adapter 112 to processor 110 and to other components of the computing system 100.

Stored in RAM 120 is an operating system 122. Operating systems useful in computers configured for performing timing analysis of a digital integrated circuit using intent based timing constraints according to embodiments of the present disclosure include UNIX™, Linux™ Microsoft Windows™, AIX™, and others as will occur to those of skill in the art. The operating system 122 in the example of FIG. 1 is shown in RAM 120, but many components of such software typically are stored in non-volatile memory also, such as, for example, on data storage 132, such as a disk drive. Also stored in RAM is an integrated circuit design application 124, including for designing digital integrated circuits such as an integrated circuit chip 150 and performing timing analysis of the digital integrated circuit using intent based timing constraints according to embodiments of the present disclosure.

The computing system 100 of FIG. 1 includes disk drive adapter 130 coupled through expansion bus 117 and bus adapter 112 to processor 110 and other components of the computing system 100. Disk drive adapter 130 connects non-volatile data storage to the computing system 100 in the form of data storage 132. Disk drive adapters useful in computers configured for inserting sequence numbers into editable tables according to embodiments of the present disclosure include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system 100 of FIG. 1 includes one or more input/output ('I/O') adapters 116. I/O adapters implement user-oriented input/output through, for example, software drivers and computer hardware for controlling output to display devices such as computer display screens, as well as user input from user input devices 118 such as keyboards and mice. The example computing system 100 of FIG. 1 includes a video adapter 134, which is an example of an I/O adapter specially designed for graphic output to a display device 136 such as a display screen or computer monitor. Video adapter 134 is connected to processor 110 through a high speed video bus 115, bus adapter 112, and the front side bus 111, which is also a high speed bus.

The exemplary computing system 100 of FIG. 1 includes a communications adapter 114 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for inserting sequence numbers into editable tables according to embodiments of the present disclosure include modems for wired dial-up communications, Ethernet (IEEE 802.3) adapters for wired data communications, and 802.11 adapters for wireless data communications. The communications adapter 114 of FIG. 1 is communicatively coupled to a wide area network 140 that also includes other computing devices, such as computing devices 141 and 142 as shown in FIG. 1.

As previously discussed, design analysis such as timing analysis is performed to ensure that the physical implementation of a chip design will meet requirements. For example, static timing analysis (STA) is generally performed to efficiently accomplish timing analysis without simulating the full integrated circuit. In STA, one or more timing signals are propagated through the simulated chip design from an input side to a timing point and timing values of interest are computed such as arrival time, slew, and slack. Different timing values may be associated with different clock types of the integrated circuit such as test clocks vs. functional clocks. STA is performed at different stages of the design, but analyzing the entire chip design at every stage is inefficient in terms of run-time. Instead, a hierarchical design methodology is used and timing analysis is performed at different hierarchical levels (e.g., core, unit, component) based on the needs at any given design stage.

A component of the chip may be, for example, a single logic gate or a collection of circuits configured to perform a specific task or function. Detailed analysis may be formed at the component level. For example, components may be timed using accurate timing analysis techniques that include transistor level timing tools or gate level timing tools. This type of detailed analysis may be followed by generation of abstract models that represent the relevant characteristics, such as timing characteristics, of the component in a simplified form. The generation of abstract models may be referred to as abstraction. At higher levels (e.g., unit level, core level), components are represented by abstracts for the purposes of performing the analysis. A unit comprised of several components, each associated with abstracts, may itself be abstracted. Because components are reused in different parts of the chip design at different levels of hierarchy, the same component may be part of different clock domains.

Some timing points or nodes may be associated with timing constraints. A constraint refers to a modification or other control exerted based on the incoming timing signal. An exemplary constraint is the adjustment of the arrival time at a node by a specified value, based on the incoming signal being a functional signal. While executing a STA procedure including propagating timing values from an input side to an output side of an integrated circuit, a timing constraint may specify modifying the timing at a node with the constraint, at a node toward the output side from the node with the constraint, or at a node toward the input side from the node with the constraint. In some situations, some constraints may be in the form of loops between components.

In order to achieve proper coverage and margining in timing analysis, STA involves the creation of a plurality of clock phases for each of several generalizable categories such as functional and test categories. Examples of such generalizable categories include functional, scan, automatic built in self-test (ABIST), array test, and gate array (GA) margin. To achieve correct timing at circuit components such as latches, local clock buffers (LCBs), and other complex circuitry, timing constraints are added which control/adjust the propagation of timing phases based on these generalizable characteristics. For example, at a particular latch input, a timing engineer may need to "don't care" all timing phases of a scan type while retaining all functional phases.

In traditional timing analysis, such timing constraints need to be explicitly written against each phase belonging to a generalizable category. It should be noted that the number of phases that can correspond to a generalizable category may be dozens or more. This traditional timing analysis approach introduces significant complexity and associated runtime and memory cost. Capturing these constraints from lower level design to upper level timing requires post-processing to make these constraints phase independent.

Many clocks of different types catering to various timing requirements may be defined in a timing analysis run. Often, in order to assert a constraint (such as a value adjustment) common to all clocks of a particular type, the same adjustment assertion needs to be applied for every functional clock defined in the system. The number of assertions on a timing point is the same as the number of clocks in a given clock type. Any new clock addition to the existing clock type requires assertions to be applied for the newly created clock. If later in the flow another clock is defined for an existing clock type, in traditional timing analysis the newly defined clock does not receive the correct assertion. It is often difficult to recognize missing assertions and looking at the assertions applied in a traditional timing run does not clearly state the intent of the assertion, and intent is lost among these plurality of assertions.

In an example intent based procedure, "don't care" signals for a particular clock type of clock may be desired with an intent to disable timing for scan signals on a functional pin or disable functional signals on a scan pin of the integrated circuit. Other intent based procedures include renames for clock division, cloning from functional to scan, ABIST, and GA margin. Capturing these assertions as part of an abstract model and accurately applying them in-context requires some post-processing to make the assertions clock domain independent.

One or more embodiments described herein provide for performing timing analysis of a digital integrated circuit using intent based timing constraints. In an embodiment, a plurality of intent based groups are defined for an integrated circuit design such as a functional intent group, a scan intent group, an ABIST intent group, a GA margin intent group, etc. Each clock phase of a plurality of clocks of the integrated circuit design is assigned to or associated with one or more of the intent groups. Timing constraints are defined with respect to each of the intent groups. During timing propagation, propagated clock phases are mapped to intent groups and the associated timing constraints are applied to the timing signals to compute one or more timing results. Constraints for a category (i.e., intent group) cover any current and further clocks defined in that category. Intent based constraints and assertions based on intent groups are captured as-is from lower level design as part of an abstract model for use in in-context analysis for upper level designs. The necessity for post-processing of constraints is avoided.

Various embodiments allow for timing assertions to be defined based on intent, e.g., for a clock type. An assertion for a clock type covers any current and future clock defined in that clock type. This removes order dependency allowing assertions to become incremental in nature. For example, a timer can apply correct assertions with a change in clocks in a particular clock type. Traditionally, designers have to apply assertion on all clocks defined of a particular clock type for a particular timing point, and have to keep track of new clock definitions or new clocks reaching a particular timing point to result in a correct final set of assertions. Various embodiments using intent base assertions allow for more intuitive, dynamic, and robust assertions in integrated circuit design. Capturing these assertions for in-context model usage becomes more straightforward and does not require extra post-processing.

Various embodiments are applicable for both incremental and non-incremental timing analysis. Various embodiments are further applicable to both deterministic and statistical timing analysis. Various embodiments provide for more efficient design of integrated circuits. For example, a rules design team is made aware of how a particular cell/pin is supposed to be used, and any intent assertions can be specified as part of standard cell rules. In another example, a designer can specify timing constraints in a concise and intuitive manner for definition specific and instance specific assertions that may be derived from, e.g., a keyword setting by the designer that results in intention based assertions in timing. In another example, a flow developer does not need to be concerned about where the assertions are applied.

In a particular embodiment, a timer processes the intent based assertions as part of incremental timing analysis which eliminates a requirement of reapplication of native or callback assertions. In a particular embodiment, propagation of intent based assertions as part of an abstracted model is made easier because the size of the abstract commands are reduced as well as the required work in a post-processing step to make phase independent abstracts. Intent based assertions are phase independent by nature.

Figure 2:
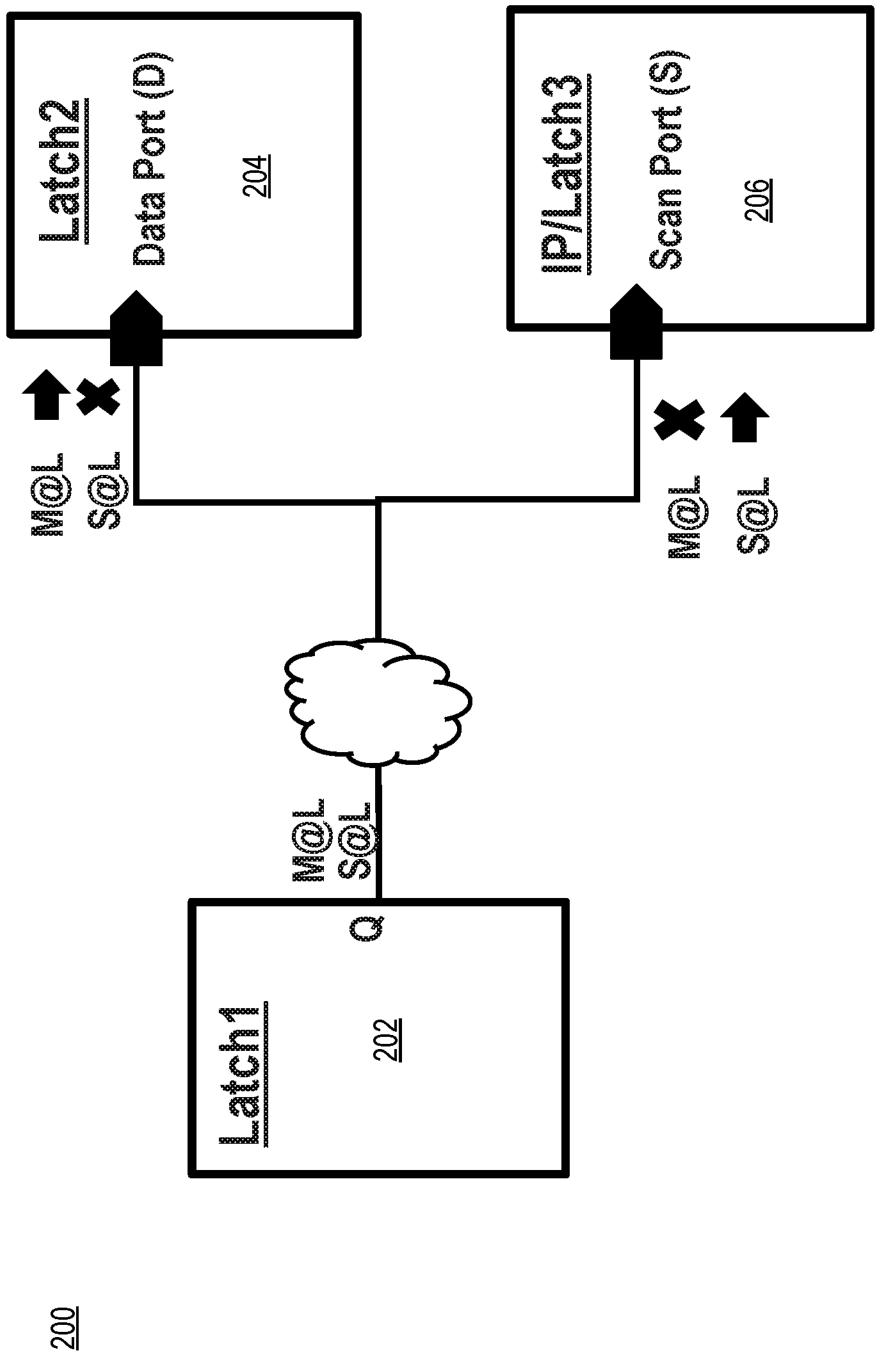
FIG. 2 shows a block diagram of a timing analysis scenario in accordance with embodiments of the present disclosure.

FIG. 2 shows a block diagram of a timing analysis scenario 200 in accordance with embodiments of the present disclosure. In the timing analysis scenario 200, a Latch1 (202) outputs, through output Q, a functional clock signal M@L and a scan clock signal S@L to a Latch2 (204) and a Latch3 (206). During timing analysis, it is desired to "don't care" scan phases on a functional pin (data port (D)) of Latch2 (204), and functional phases on a scan pin (scan port (S) of Latch3 (206). In traditional timing analysis, timing constraints need to be explicitly written against each phase. An example traditional command structure is as follows:

```
et::dont_care_signal -pin Latch2/D -phase S@L
et::dont_care_signal -pin Latch2/D -phase S1@L
. . .
et::dont_care_signal -pin Latch2/D -phase SMCw@T
et::dont_care_signal -pin Latch3/S -phase M@L
et::dont_care_signal -pin Latch3/S -phase Mx2@L
. . .
et::dont_care_signal -pin Latch3/S -phase AB_Mx8W@T
```

Accordingly, a "don't care" status of each pin of Latch2 (204) and Latch3 (206) is explicitly configured for each phase of the functional and scan phases of the clock.

In one or more embodiments, a functional intent group is defined for the functional clock type and a scan intent group is defined for the scan clock type. An example command structure according to an embodiment is as follows:

```
et::dont_care_signal -pin Latch2/D -clock_types {scan@L scan@T}
et::dont_care_signal -pin Latch3/S -clock_types {functional@L
functional@T}
```

Accordingly, the "don't care" status of the data port (D) pin of Latch2 (204) for all scan clock types and the "don't care" status of the scan port (S) pin of Latch3 (206) for all functional clock types are configured using a single command for each.

Figure 3:
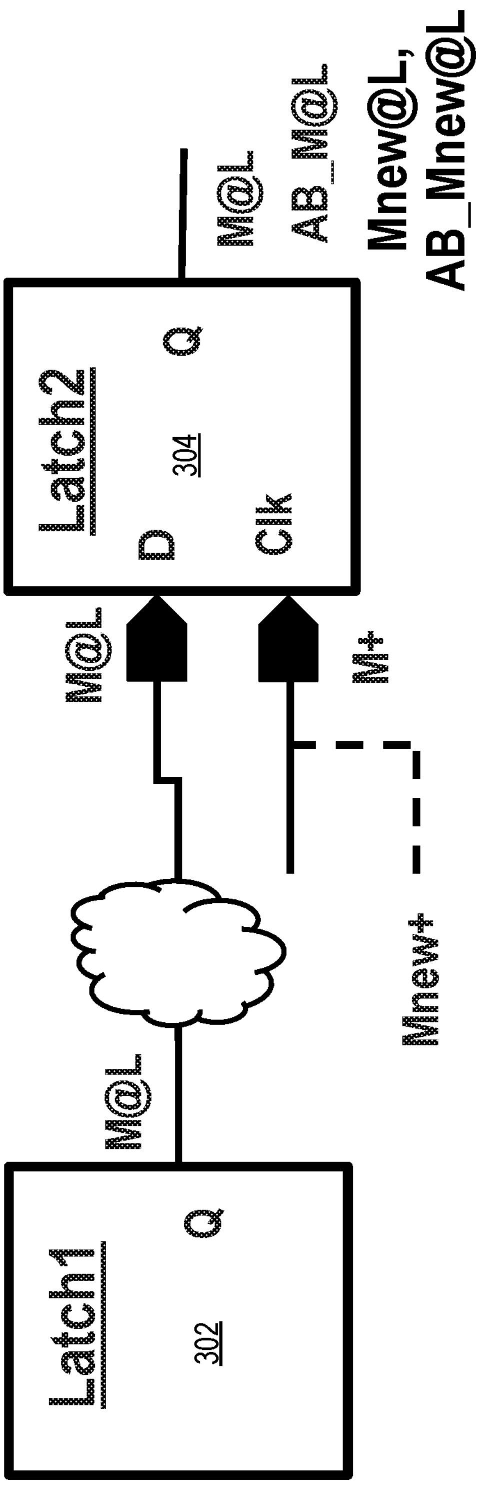
FIG. 3 shows a block diagram of another timing analysis scenario in accordance with embodiments of the present disclosure.

FIG. 3 shows a block diagram of another timing analysis scenario 300 in accordance with embodiments of the present disclosure. In timing analysis scenario 300, it is desired to clone an ABIST phase on an output of a ABIST launch/propagate latch. A Latch1 (302) generates an ABIST phase and it is desired to clone the ABIST phase on a Latch2 (304) and propagate the cloned ABIST phase. An example traditional command structure is as follows:

```
et::clone_phase -pin Latch2/Q-phase M@L -new_phase AB_M@L
et::clone_phase -pin Latch2/Q-phase Mx2@L -new_phase AB_Mx2@L
....
et::clone_phase -pin Latch2/Q-phase Mx8W@L -new_phase
AB_Mx8W@L
```

In one or more embodiments, a functional intent group is defined for the functional clock type and an ABIST intent group is defined for the ABIST clock type. An example command structure according to an embodiment is as follows:

```
et::clone_phase -pin Latch2/Q -clock_type functional@L
-new_clock_type abist@L
et::clone_phase -pin Latch2/Q -clock_type functional@T
-new_clock_type abist@T
```

In a similar example scenario, a GA margin phase on an output of a GA margin launch latch Latch1 (302) is cloned to Latch2 (304). An example traditional command structure is as follows:

```
et::clone_phase -pin Latch2/Q -phase M@L -new_phase GA_M@L
et::clone_phase -pin Latch2/Q -phase Mx2@L -new_phase GA_Mx2@L
....
et::clone_phase -pin Latch2/Q -phase Mx8W@L -new_phase
GA_Mx8W@L
```

In one or more embodiments, a functional intent group is defined for the functional clock type and a GA margin intent group is defined for the GA margin clock type. An example command structure according to an embodiment is as follows:

```
et::clone_phase -pin Latch2/Q -clock_type functional@L
-new_clock_type ga@L
```

-continued

```
et::clone_phase -pin Latch2/Q -clock_type functional@T
-new_clock_type ga@T
```

In the traditional implementation, assertions are static and do not work with new propagated phases. The new functional clock Mnew+ at Latch2/Clk results in Mnew@L at Latdch2/Q. The intended cloning of Mnew@L to AB_Mnew@L does not happen with incremental phase propagation. In contrast, in an embodiment incremental assertions are handled correctly. For example, new functional clock Mnew+ at Latch2/Clk results in Mnew@L at Latch2/Q. Cloning of Mnew@L to AB_Mnew@L is done as part of incremental phase propagation.

Figure 4:
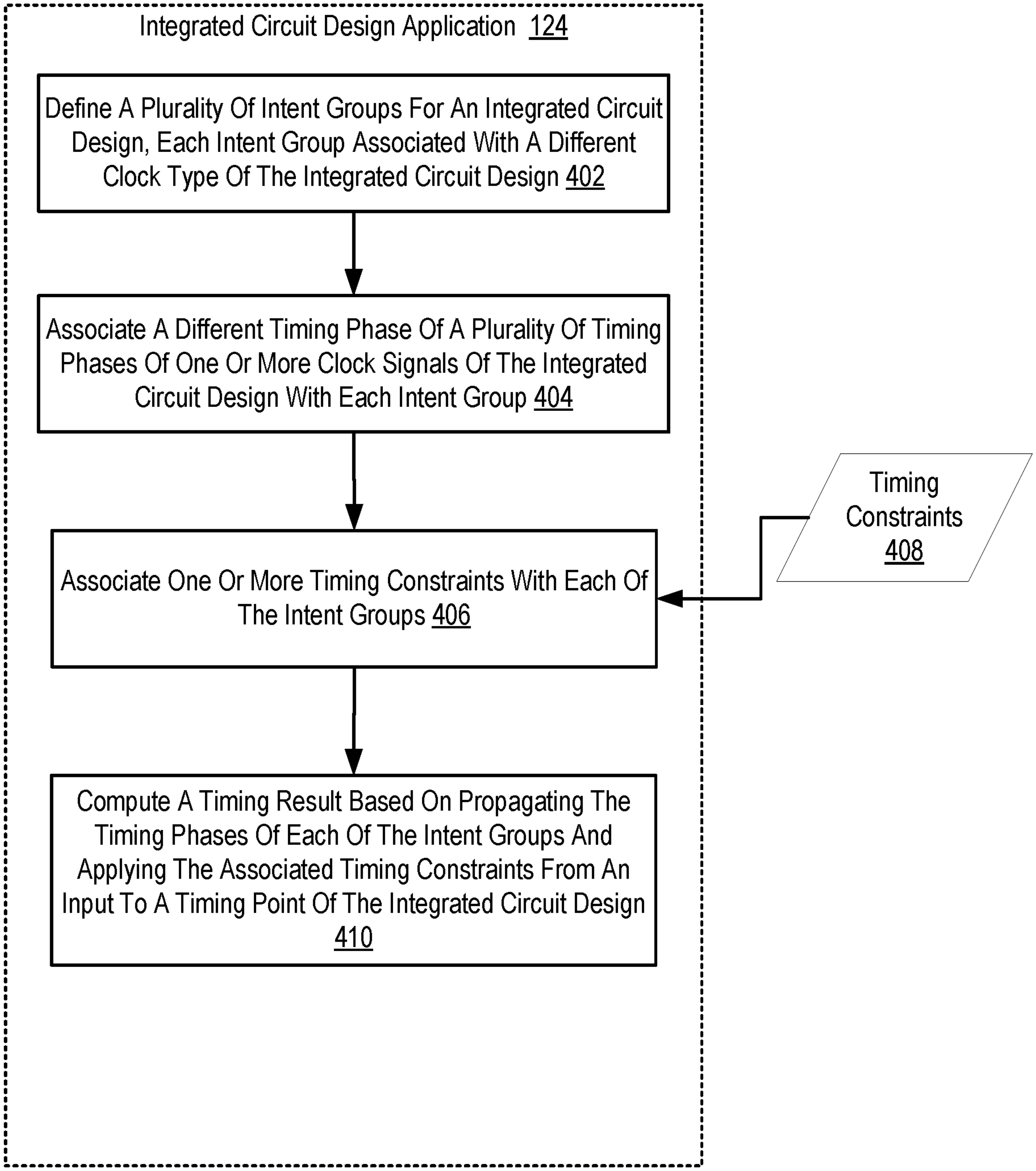
FIG. 4 is a flowchart of an example method for performing timing analysis of a digital integrated circuit using intent based timing constraints according to some embodiments of the present disclosure.

For further explanation, FIG. 4 sets forth a flowchart of an example method for performing timing analysis of a digital integrated circuit using intent based timing constraints according to some embodiments of the present disclosure. In a particular embodiment, the method of FIG. 4 is performed utilizing the integrated circuit design application 124. The method of FIG. 4 includes defining 402 a plurality of intent groups for an integrated circuit design. Each intent group is associated with a different clock type of the integrated circuit design. In some embodiments, the plurality of intent groups includes one or more of a functional intent group, a scan intent group, an array test intent group, and a margining intent group.

The method of FIG. 4 further includes associating 404 a different timing phase of a plurality of timing phases of one or more clock signals of the integrated circuit design with each intent group. In some embodiments, each of the plurality of intent groups is associated with a particular intent group index value, and the association of the intent group with the particular intent group index value is stored in an index. In some embodiments, associating a different timing phase of the plurality of timing phases of one or more clock signals of the integrated circuit design with each intent group further includes associating a particular timing phase with the particular index value.

The method of FIG. 4 further includes associating 406 one or more timing constraints 408 with each of the intent groups. In some embodiments, the integrated circuit design application retrieves the one or more timing constraints from a database including one or more functional circuit component designs and associated timing constraints.

The method of FIG. 4 further includes computing 410 a timing result based on propagating the timing phases of each of the intent groups and applying the associated timing constraints from an input to a timing point of the integrated circuit design.

Figure 5:
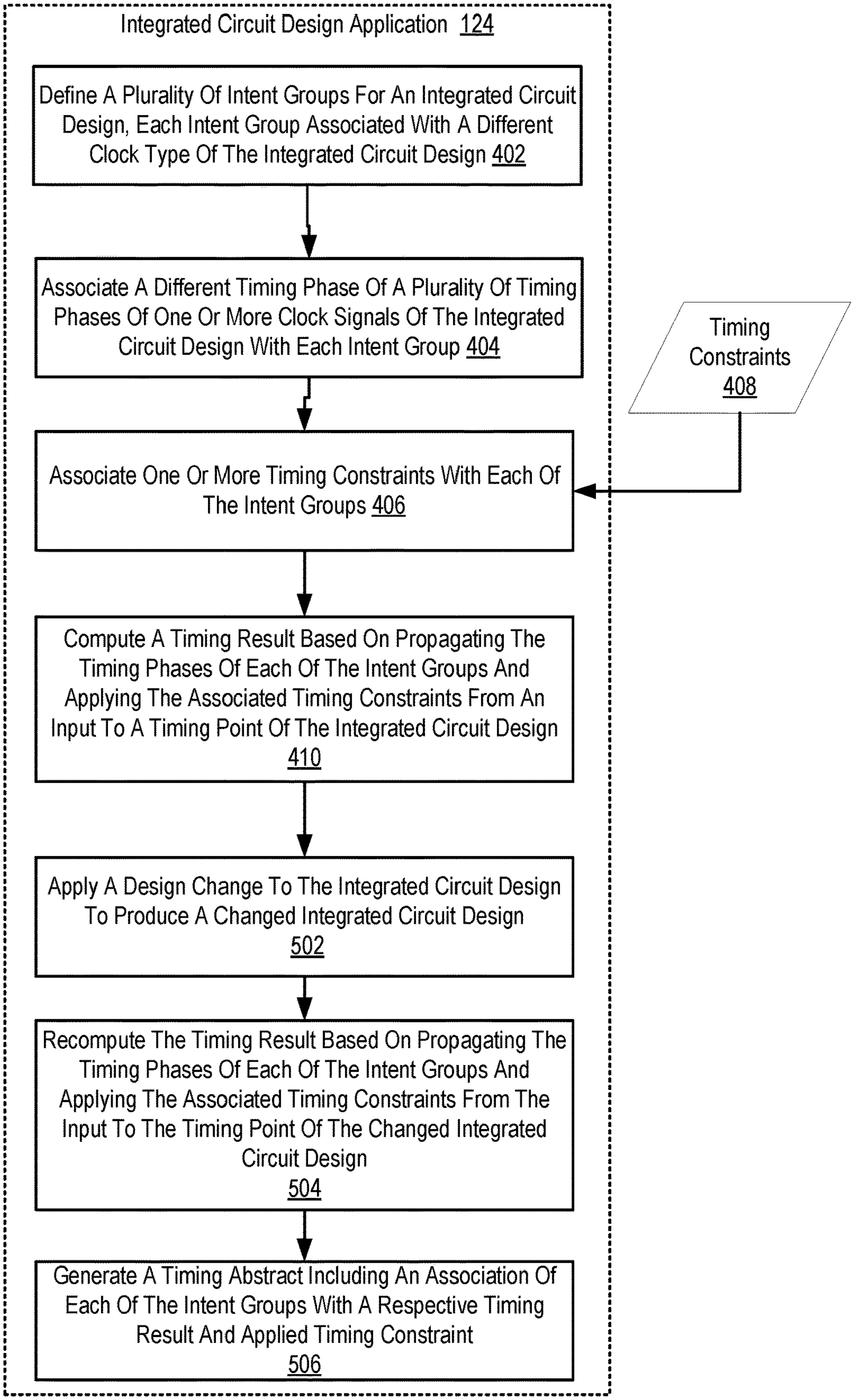
FIG. 5 is a flowchart of another example method for performing timing analysis of a digital integrated circuit using intent based timing constraints according to some embodiments of the present disclosure.

For further explanation, FIG. 5 sets forth a flowchart of another example method for performing timing analysis of a digital integrated circuit using intent based timing constraints according to some embodiments of the present disclosure. The method of FIG. 5 continues with the method of FIG. 4 by further applying 502 a design change to the integrated circuit design to produce a changed integrated circuit design in response to the computed timing result. The method of FIG. 5 further includes recomputing 504 the timing result based on propagating the timing phases of each of the intent groups and applying the associated timing constraints from the input to the timing point of the changed integrated circuit design.

The method of FIG. 5 further includes generating 506 a timing abstract including an association of each of the intent groups with a respective timing result and applied timing constraint.

Figure 6:
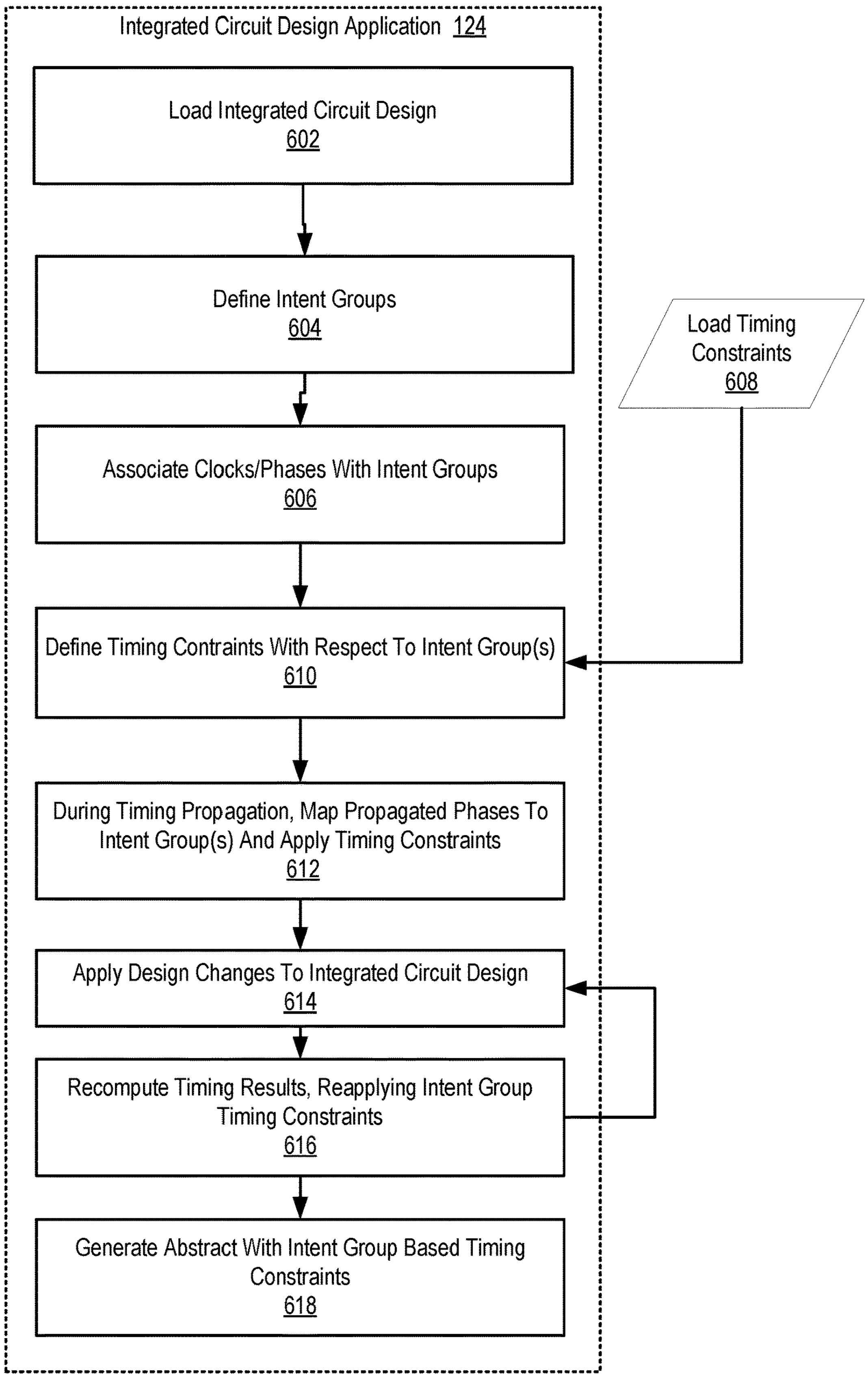
FIG. 6 is a flowchart of another example method for performing timing analysis of a digital integrated circuit using intent based timing constraints according to some embodiments of the present disclosure.

For further explanation, FIG. 6 sets forth a flowchart of another example method for performing timing analysis of a digital integrated circuit using intent based timing constraints according to some embodiments of the present disclosure. The integrated circuit design application 124 loads 602 an integrated circuit design and defines 604 intent groups for the integrated circuit design in which each intent group is associated with a different clock type of the integrated circuit design.

The method of FIG. 6 further includes associating 606 clocks/phases of the integrated circuit design with the intent groups. In a particular embodiment, a different timing phase of a plurality of timing phases of one or more clock signals of the integrated circuit design is associated with each of the intent groups. The method of FIG. 6 further includes loading 608 timing constraints and defining 610 the timing constraints with the respect to the intent groups. In a particular embodiment, the timing constraints are loaded from a database including an association of components with respective timing constraints. In a particular embodiment, defining the timing constraints with respect to the intent groups includes associating one or more of the timing constraints with each of the intent groups.

The method of FIG. 6 further includes, during timing propagation, mapping 612 propagated phases to the intent groups and applying the associated timing constraints to the intent groups to compute one or more timing results. In a particular embodiment, one or more timing results are computed based on propagating the timing phases of each of the intent groups and applying the associated timing constraints from an input to a timing point of the integrated circuit design.

The method of FIG. 6 further includes applying 614 design changes to the integrated circuit design in response to the computed timing results, and recomputing 616 the timing results by reapplying the intent group timing restraints to the new integrated circuit design. In particular embodiments, applying 614 design changes and recomputing 616 the timing results is repeated until desired timing results are achieved.

The method of FIG. 6 further includes generating 618 an abstract with the intent group based timing constraints and associated timing results.

In an example timing analysis with intent based timing constraints in accordance with an embodiment includes an exemplary constraint of "don't care" timing phases on a timing point. A "don't care" constraint for an intent group is applied on the timing point and the constraint is saved on the timing point with an intent group index to facilitate quick access. The intent group is defined earlier in the timing flow and a unique category index is established for the intent group.

In analysis step of "get timing phases on a timing point", clock phases propagating from timing segments to a timing point are collected. For each such propagated phase, a timer checks whether the phase has a "don't care" constraint. With intent group constraints, the timer checks for the presence of an intent-group specific "don't care" constraint for the intent group associated with the clock phase. The category index from the propagated phase is matched with the category index saved in the constraint on the timing point. The association of a category with its index is used for faster access times. If such a "don't care" constraint is found, that timing phase is not propagated forward in a timing graph.

An incremental change upstream from the timing point previously analyzed results in queueing the timing point for recalculation of timing phases, and the analysis step will be performed again to obtain an updated list of timing phases for forward propagation.

In view of the explanations set forth above, readers will recognize that the benefits of performing timing analysis of a digital integrated circuit using intent based timing constraints according to embodiments of the present disclosure include:

- Reduces complexity of timing constraints by simplifying design intent including removing the need for replication of assertions.
- Intent based constraints can be specified either as part of a standard cell rules or as part of a design netlist.
- The order of constraints do not matter resulting in simpler flow.
- Constraint application is performed with lower runtime (e.g., from hours to a few minutes) and a lower memory footprint is required compared to traditional methods.
- Incremental changes resulting in new propagated phases obtain correct constraints which reduces the complexity of timing flows.
- Intent specific constraints are captured as part of an abstracted model for use in upper level timing analysis which eliminates post-processing steps and reduces the number of constraints.

Exemplary embodiments of the present disclosure are described largely in the context of a fully functional computer system for performing timing analysis of a digital integrated circuit using intent based timing constraints. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for timing analysis of an integrated circuit, the method comprising:

defining a plurality of intent groups for an integrated circuit design, each intent group being a category of clock phases of a common clock type and serving as a target to which a timing constraint is attached for application to clock phases mapped to the category, each intent group associated with a different clock type of the integrated circuit design;

associating a different timing phase of a plurality of timing phases of one or more clock signals of the integrated circuit design with each intent group;

associating one or more timing constraints with each of the intent groups; and computing a timing result based on propagating the timing phases of each of the intent groups and applying the associated timing constraints from an input to a timing point of the integrated circuit design.

2. The method of claim 1, further comprising:

applying a design change to the integrated circuit design to produce a changed integrated circuit design; and recomputing the timing result based on propagating the timing phases of each of the intent groups and applying the associated timing constraints from the input to the timing point of the changed integrated circuit design.

3. The method of claim 1, further comprising:

generating a timing abstract including an association of each of the intent groups with a respective timing result and applied timing constraint.

4. The method of claim 1, further comprising:

associating each of the plurality of intent groups with a particular intent group index value; and storing the association of the intent group with the particular intent group index value in an index.

5. The method of claim 4, wherein associating a different timing phase of a plurality of timing phases of one or more clock signals of the integrated circuit design with each intent group further comprises associating a particular timing phase with the particular index value.

6. The method of claim 1, wherein the plurality of intent groups includes one or more of a functional intent group, a scan intent group, an array test intent group, and a margining intent group.

7. The method of claim 1, further comprising retrieving the one or more timing constraints from a database.

8. The method of claim 7, wherein the database includes one or more functional circuitry component designs and associated timing constraints.

9. An apparatus for timing analysis of an integrated circuit, the apparatus comprising:

a computer processor; and a computer memory operatively coupled to the computer processor, the computer memory having disposed within it computer program instructions that, when executed by the computer processor, cause the apparatus to:

define a plurality of intent groups for an integrated circuit design, each intent group being a category of clock phases of a common clock type and serving as a target to which a timing constraint is attached for application to clock phases mapped to the category, each intent group associated with a different clock type of the integrated circuit design;

associate a different timing phase of a plurality of timing phases of one or more clock signals of the integrated circuit design with each intent group;

associate one or more timing constraints with each of the intent groups; and compute a timing result based on propagating the timing phases of each of the intent groups and applying the associated timing constraints from an input to a timing point of the integrated circuit design.

10. The apparatus of claim 9, wherein the computer program instructions further cause the apparatus to:

apply a design change to the integrated circuit design to produce a changed integrated circuit design; and recompute the timing result based on propagating the timing phases of each of the intent groups and applying the associated timing constraints from the input to the timing point of the changed integrated circuit design.

11. The apparatus of claim 9, wherein the computer program instructions further cause the apparatus to generate a timing abstract including an association of each of the intent groups with a respective timing result and applied timing constraint.

12. The apparatus of claim 9, wherein the computer program instructions further cause the apparatus to:

associate each of the plurality of intent groups with a particular intent group index value; and store the association of the intent group with the particular intent group index value in an index.

13. The apparatus of claim 12, wherein associating a different timing phase of a plurality of timing phases of one or more clock signals of the integrated circuit design with each intent group further comprises associating a particular timing phase with the particular index value.

14. The apparatus of claim 9, wherein the plurality of intent groups includes one or more of a functional intent group, a scan intent group, an array test intent group, and a margining intent group.

15. The apparatus of claim 9, wherein the computer program instructions further cause the apparatus to retrieve the one or more timing constraints from a database.

16. The apparatus of claim 15, wherein the database includes one or more functional circuitry component designs and associated timing constraints.

17. A computer program product for timing analysis of an integrated circuit, the computer program product disposed upon a computer readable medium, the computer program product comprising computer program instructions that, when executed, cause a computer to:

define a plurality of intent groups for an integrated circuit design, each intent group being a category of clock phases of a common clock type and serving as a target to which a timing constraint is attached for application to clock phases mapped to the category, each intent group associated with a different clock type of the integrated circuit design;

associate a different timing phase of a plurality of timing phases of one or more clock signals of the integrated circuit design with each intent group;

associate one or more timing constraints with each of the intent groups; and compute a timing result based on propagating the timing phases of each of the intent groups and applying the associated timing constraints from an input to a timing point of the integrated circuit design.

18. The computer program product of claim 17, wherein the computer program instructions further cause the computer to:

apply a design change to the integrated circuit design to produce a changed integrated circuit design; and recompute the timing result based on propagating the timing phases of each of the intent groups and applying the associated timing constraints from the input to the timing point of the changed integrated circuit design.

19. The computer program product of claim 17, wherein the computer program instructions further cause the computer to generate a timing abstract including an association of each of the intent groups with a respective timing result and applied timing constraint.

20. The computer program product of claim 17, wherein the computer program instructions further cause the computer to:

associate each of the plurality of intent groups with a particular intent group index value; and store the association of the intent group with the particular intent group index value in an index.

* * * * *